United States Patent [19]

Bowditch et al.

[11] 4,395,922
[45] Aug. 2, 1983

[54] GIMBALLED STABILIZATION SYSTEM WITH MEANS FOR SUPPRESSION OF DITHER CHARACTERISTICS

[75] Inventors: Philip N. Bowditch, Cohasset; James E. Negro, Wellesley, both of Mass.

[73] Assignee: The Charles Stark Draper Laboratory, Inc., Cambridge, Mass.

[21] Appl. No.: 231,304

[22] Filed: Feb. 4, 1981

[51] Int. Cl.³ .............. G01C 19/22; C01C 19/28; G01C 19/30
[52] U.S. Cl. .................. 74/5.6 D; 74/5 F; 74/5.47; 74/5.6 R
[58] Field of Search ............ 74/5 F, 5.6 R, 5.6 D, 74/5.6 E, 5.4, 5.41, 5.47

[56] References Cited

U.S. PATENT DOCUMENTS

| | | | |
|---|---|---|---|
| 2,384,838 | 9/1945 | Kellogg | 74/5 |
| 2,698,542 | 1/1955 | Fisher-Luttrelle et al. | 74/5.7 |
| 2,771,778 | 11/1956 | Ryberg | 74/5 |
| 3,009,360 | 11/1961 | Morsewich | 74/5 |
| 3,234,798 | 2/1966 | Burdick | 74/5.6 D |
| 3,264,880 | 8/1966 | Fischel | 74/5 |
| 3,301,073 | 1/1967 | Howe | 74/5.7 |
| 3,307,411 | 3/1967 | Granqvist | 74/5 |
| 3,430,276 | 3/1969 | Ashley et al. | 74/5 |
| 3,483,760 | 12/1969 | Hurlburt | 74/5 |
| 3,512,264 | 5/1970 | Ambrosini | 33/226 |
| 3,534,616 | 10/1970 | O'Connor | 74/5 |
| 3,550,395 | 12/1970 | Herzog et al. | |
| 3,678,764 | 7/1972 | Erdley et al. | 74/5 |
| 3,702,568 | 11/1972 | Howe | 74/5 |
| 3,703,831 | 11/1972 | Schauffler | 74/5 |
| 3,722,296 | 3/1973 | Hurlburt et al. | 74/5 |
| 3,943,778 | 3/1976 | Wyse | 74/5 F |
| 4,000,659 | 1/1977 | Li | 73/5.4 |
| 4,005,608 | 2/1977 | Lanni et al. | 74/5.4 X |
| 4,158,261 | 6/1979 | Auer | 33/324 |

Primary Examiner—Rodney H. Bonck
Attorney, Agent, or Firm—Lahive & Cockfield

[57] ABSTRACT

A gimballed platform stabilization system includes at least one outer member, an inner member, and an intermediate inertia bearing member. The intermediate member has limited coaxial angular freedom about an isolation axis with respect to the inner and outer members. A limited freedom (about the isolation axis) torsional flexure element is coupled between the intermediate and inner members. A first servo loop establishes a "negative spring rate" in parallel with the positive spring rate associated with the flexure element, maintaining a low net effective spring force on the inner member. A second servo loop prevents the angular excursion between the intermediate member and the inner member to extend beyond the limits of the flexure element. This inertia reaction stabilization configuration reduces disturbing torques from a stabilization axis to non-linear spring residuals which are relatively small.

4 Claims, 5 Drawing Figures

GIMBALLED STABILIZATION SYSTEM WITH MEANS FOR SUPPRESSION OF DITHER CHARACTERISTICS

This invention relates to the field of gimballed platform stabilization systems, and more particularly, is directed to systems for isolating various members of a gimballed system from base motion.

Conventional gimballed platform stabilization systems are often subject to substantial levels of dither disturbances. These disturbances are generally caused by non-linear frictional torquing transients introduced by the components which isolate the platform from base motion, such as the bearings, slip rings, brushes and the like. These non-linear effects result in a resonant frequency dither response which can be on the order of minutes of arc in the case of step base motion excitations.

One prior art approach to suppress the dither characteristics in such systems requires that the stabilized element, or platform, be completely frictionally decoupled from base motion isolation hardware, for example, by way of air bearings, or floatation. Stabilization torquing for the stabilized element is then provided by inertial reaction wheels, or jets, control moment gyros, or other inertia reaction devices. This approach, however, is relatively complex mechanically and has a limited ability to keep track of base motion euler angles.

An alternative prior art approach is a servo loop which provides suppression of non-linear effects introduced by a major frictional element, particularly the slip rings. This approach provides a separate servo around the slip rings, which provides a measure of the error in the desired position versus the actual position of the rings. A torquer, outside the main stabilization torquer, provides a torque to drive this error to null. Leads are flex-coupled to the stabilized element to provide electrical continuity. This approach generally suppresses dither due to the slip ring element only and does not offset bearing and main stabilization torquer frictional non-linearity excitation sources. Thus, although suppressing one troublesome element of dither excitation, it fails to accommodate dither due to the bearings, motor brush or other stiction exciters.

U.S. Pat. No. 3,534,616 discloses an approach to reduce the coupling of torques to a stabilized platform by incorporating a limited freedom torsional flexure pivot element between the platform and the outer, or base, member. An angle sensor provides a signal representative of the angle across the flexure and applies that signal to a torquer. The toruqer is coupled in a servo loop which torques the outer portion of the flexure with respect to the base member in a manner nulling the angle across the flexure. This configuration, when operating in the dynamic range of the flexure, provides a relatively frictionless coupling between the base member and platform. However, this coupling is characterized by the relatively high spring rate of the flexure, and the resultant configuration is characterized by a relatively little isolation at high frequency. Moreover, this approach permits continual angle build-up, which requires large degrees of motion by the sensor to prevent saturation from occurring.

Accordingly, it is an object of the present invention to provide an improved gimballed platform stabilization system.

It is another object to provide a gimballed platform stabilization system with a substantially suppressed resonant frequency dither response.

SUMMARY OF THE INVENTION

Briefly, the gimballed platform stabilization system of the present invention includes at least one outer member, an inner member, and an intermediate inertia bearing member between those inner and outer members. The intermediate member has limited coaxial angular freedom about an isolation axis with respect to the inner and outer members. A limited freedom (about the isolation axis) torsional flexure element is coupled between the intermediate and inner members. The system also includes a sensor for producing a platform signal representative of the measured angular position of the platform about the isolation axis, and another sensor adapted to provide a flexure signal representative of the angular displacement between the intermediate member and the inner member (that is, the angular displacement across the flexure).

A first torquer is connected across the flexure element to provide a torque about the isolation axis to the inner member with respect to the intermediate member in response to a first control signal representative of the sum of the platform signal and the flexure signal. These elements are connected in a first servo loop so that the torquer is adapted to null the first control signal. With this configuration, the first torquer establishes a "negative spring rate" in parallel with the positive spring rate associated with the flexure element. The net effective spring force on the inner member is consequently maintained very low by means of this open loop negative electrical spring (i.e. with approximately zero compliance, or zero spring rate).

A second torquer is adapted to provide a torque about the isolation axis to the intermediate member with respect to the outer member. The second torquer is responsive to a second control signal representative of the flexure signal in a second (position follower) servo loop which prevents the angular excursion between the intermediate member and the inner member to extend beyond the limits of the flexure element, such as 20 minutes of arc maximum.

Thus, in operation, the inner, or first, servo loop establishes a relatively low (near zero) spring rate coupling and also provides the necessary acceleration of the stabilized member. In addition, as the angular freedom between the intermediate member and the stabilized member is used up by this requirement, the outer position follower servo loop returns the system to the center of its dynamic range, so that the flexure element is always within its excursion limits.

Generally, the inertia reaction stabilization approach of the present invention reduces disturbing torques from a stabilization axis to non-linear spring residuals which are relatively small. The stabilization dither errors with the present invention are on the order of one or two orders of magnitude better than the conventional servo approaches, and permit much more economical fabrication than the sophisticated, and correspondingly expensive air bearing and floatation type systems.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
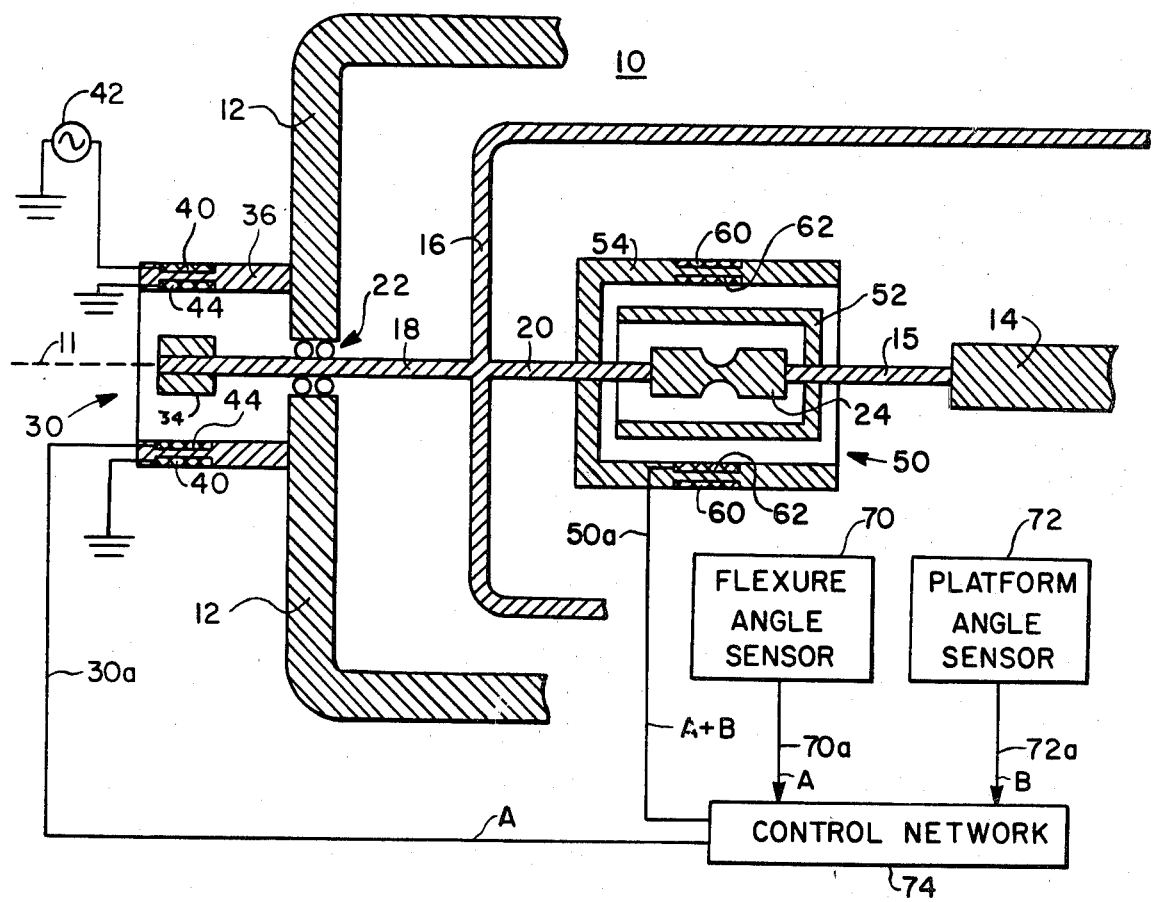
FIG. 1 shows an exemplary embodiment of the present invention having single axis isolation.

FIG. 1 shows one side of a symmetrical gimballed stabilization system 10 providing isolation with respect to a single axis 11 between an outer (or base) member 12 and a stabilized inner member (or platform) 14. In alternate forms of the invention, the platform 14 may be the central element of a nested gimballed configuration which has additional isolation axes, as described below in conjunction with FIGS. 5 and 6.

In the embodiment of FIG. 1, platform 14 includes a support shaft 15 which is coaxial with axis 11. A relatively large moment of inertia intermediate inertia member (or gimbal) 16 has outer and inner shafts 18 and 20, respectively, coaxial with axis 11. Shaft 18 is coupled to the base member 12 by way of a ball bearing 22 and shaft 20 is coupled to the support shaft 15 by way of a limited freedom torsional flexure pivot element 24. By way of example, flexure element 24 may be a "Flexpivot" manufactured by Bendix Corporation.

A torquer 30 is connected between base member 12 and shaft 18 so that the shaft 18 may be torqued about axis 11 and with respect to base member 12 in response to a drive signal on line 30a. The torquer 30 is a conventional two-phase reversible torquer and includes a rotor 34 affixed to shaft 18 and a stator 36 affixed to base member 12. Stator 36 includes a fixed phase winding 40 driven by altermating current source 42, and includes a control winding 44 driven by the control signal on line 30a.

A torquer 50, similar to torquer 30 in this embodiment, is connected between shaft 15 and shaft 20, i.e. across the flexure element 24. Torquer 50 includes a rotor 52 affixed to shaft 15 and a stator 54 affixed to shaft 20. Stator 54 includes a fixed phase winding 60, driven by an alternating current source (not shown), and includes a control winding 62 driven by a control signal on line 50a. Torquer 50 is herein referred to as the first torquer and torquer 30 is herein referred to as the second torquer.

System 10 further includes a flexure angle sensor 70, a platform angle sensor 72 and an associated control network 74, all illustrated in FIG. 1 in block diagram form. Sensor 70 provides a signal A on line 70a representative of the angular displacement of shaft 20 relative to shaft 15. By way of example, the sensor 70 may be a micro-syn type transducer.

Sensor 72 provides a signal B on line 72a representative of the angular position (about axis 11) of platform 14. By way of example, the sensor 72 may be a conventional integrating gyro positioned on platform 14. Alternatively, the sensor 72 may include a rate gyro and associated integrating network.

In one form of the invention, the network 74 provides a signal on line 50a which is proportional to A+B, and provides a signal on line 30a which is proportional to A. With this configuration, a first servo loop including sensor 70, sensor 72, network 74, torquer 50 and flexure 24 provides a pseudo inertia reaction stabilization for platform 14. A second servo loop including platform 14, sensor 72, control network 74, torquer 30 and flexure 24 acts as a position follower loop, maintaining the operation of the first loop within the operational range for flexure element 24, preventing that element from reaching its excursion limit.

Figure 2:
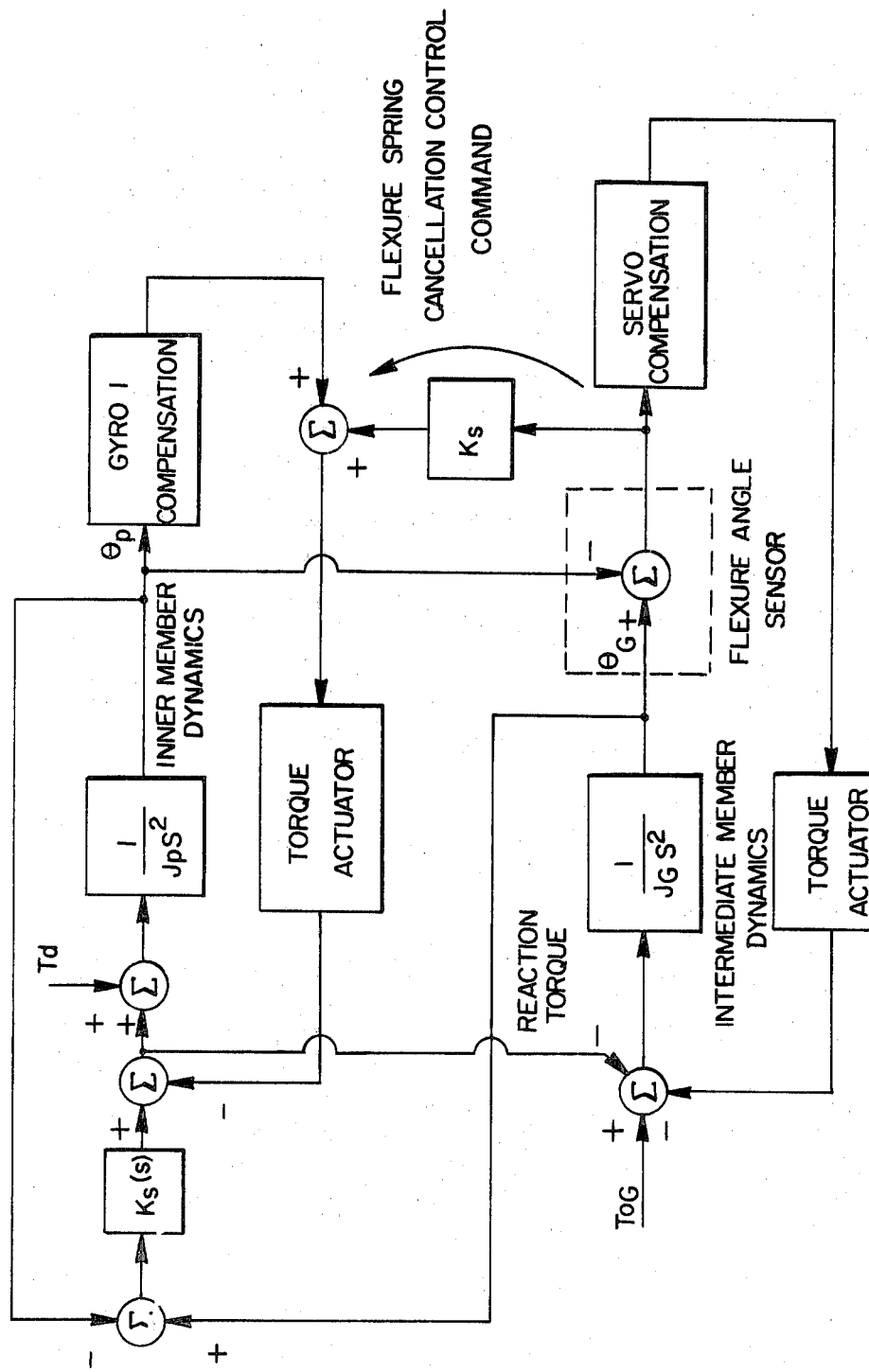
FIG. 2 shows a model of the embodiment of FIG. 1.
Figure 3:
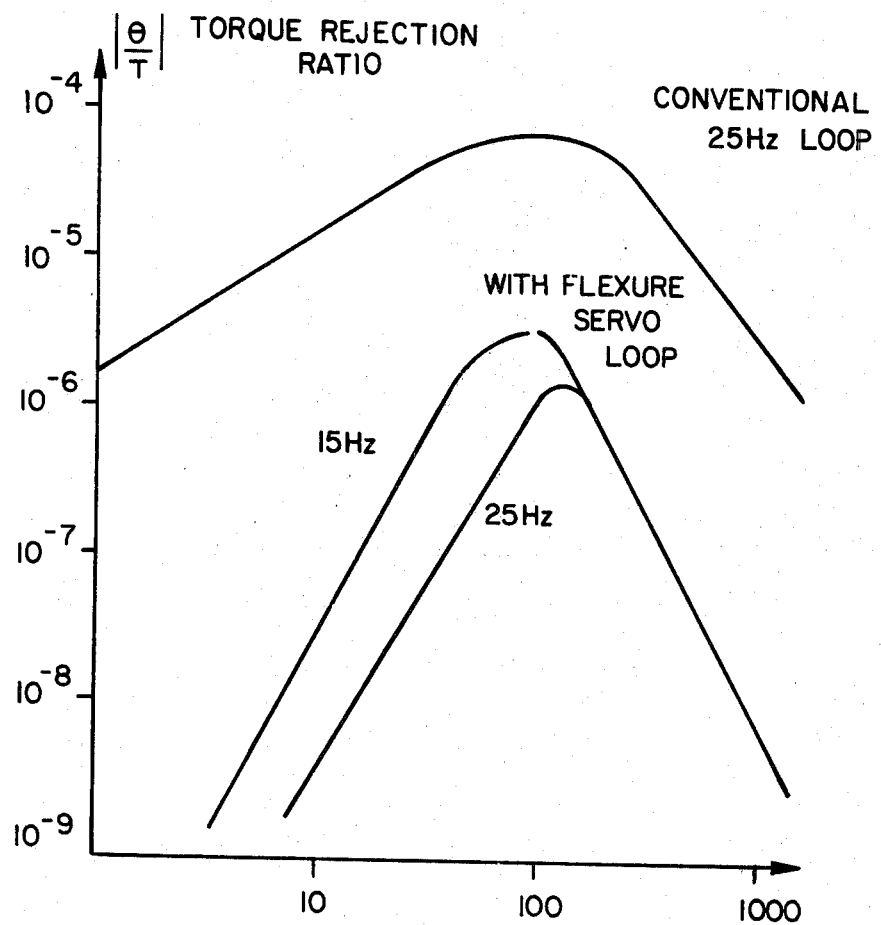
FIG. 3 shows the torque rejection ratio as a function of frequency for the embodiment of FIG. 1.

FIG. 2 shows a model for the system of FIG. 1, and FIG. 3 shows the torque rejection ratio as a function of frequency for the system of FIG. 1 (for 15Hz and 25Hz bandwidth loops) compared with a conventional 25 Hz bandwidth loop. In FIG. 2, $T_d$ represents the inner member disturbance torque, $T_{DG}$ represents the intermediate member disturbance torques, $\theta_p$ represents the angle of the inner member (platform) 14 and $\theta_G$ represents the angle of the intermediate member 16. The blocks $K_s(S)$ represents the flexure and various torques associated with the inner and intermediate members.

Figure 5:
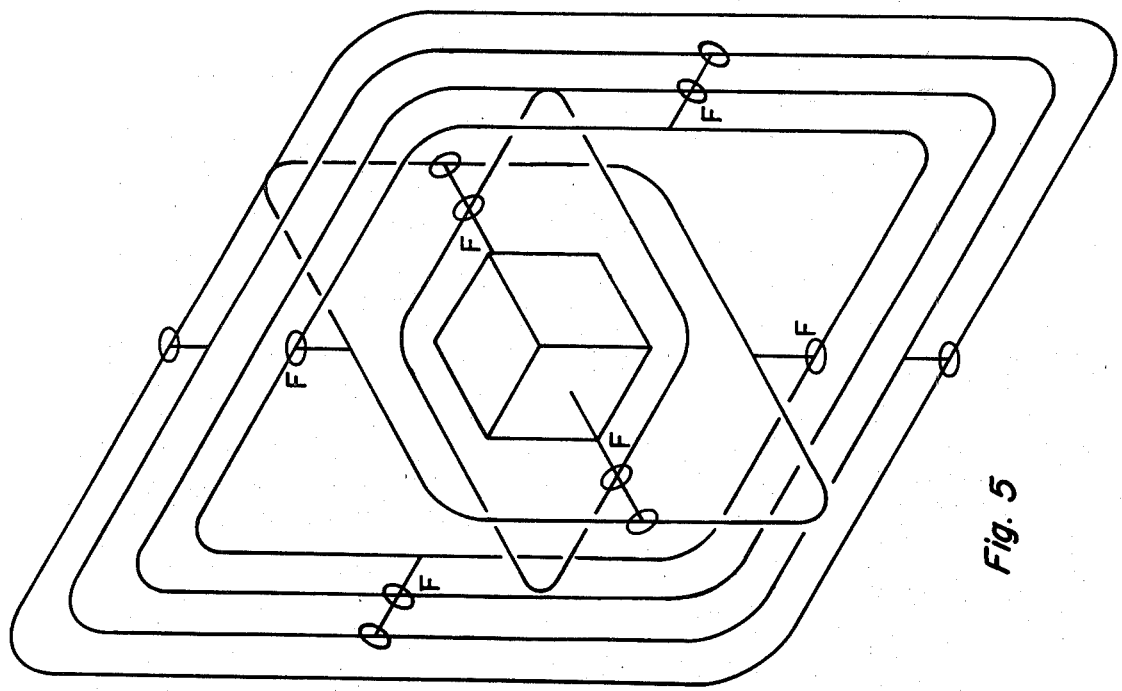
FIGS. 4 and 5 show in schematic form, alternate embodiments having multiple axis isolation.
Figure 4:
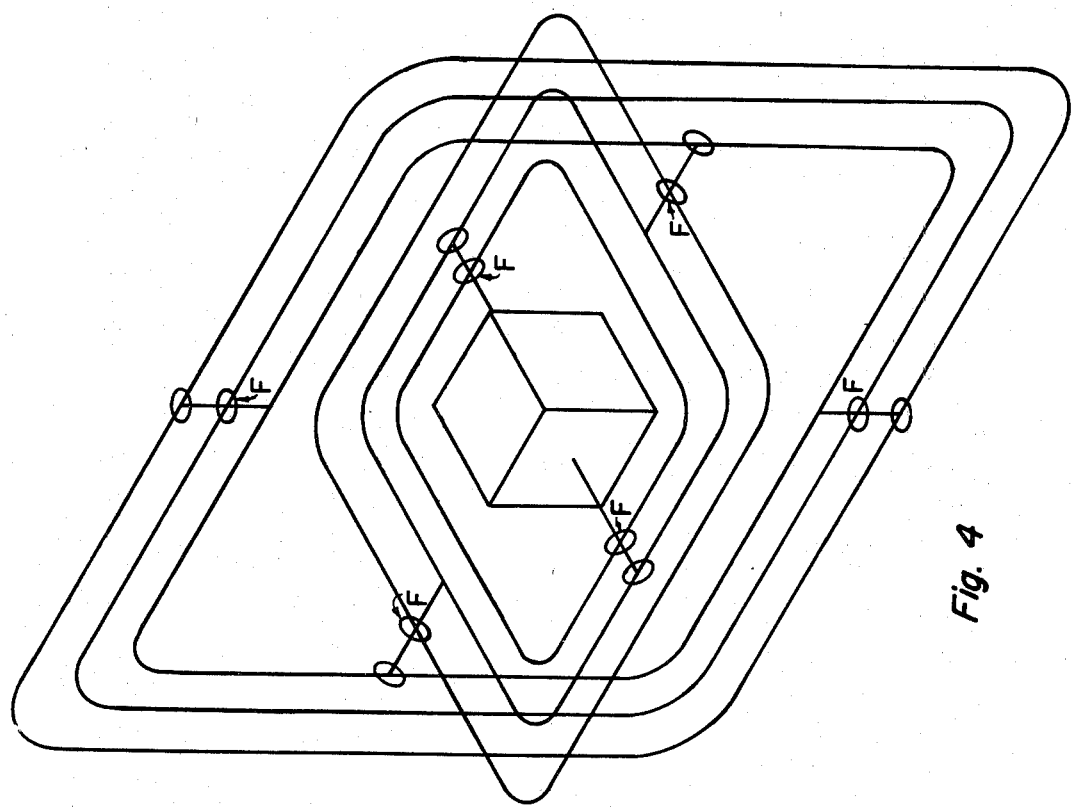

While the above-described embodiment provides dual servo loop isolation for a single axis, any number of isolation axes may be similarly configured to provide suppression of the dither for those respective axes. By way of example, FIGS. 4 and 5 illustrate two forms of dual servo loop isolation for three-axis stabilization systems. In these figures, the intermediate members (which are coupled to the flexure elements) are indicated by the reference designation "F". The inner member angles for these various isolation axes may be determined from the platform angle, taken together with information representative of the relative gimbal orientations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A gimballed system for stabilizing an inner members with respect to an outer member about at least one axis, comprising:

A. an outer member,
   B. an intermediate member, said intermediate member being rotationally coupled about said axis to said outer member,
   C. an inner member
   D. a torsional flexure and associated means for coupling said flexure between said intermediate member and said inner member along said one axis,
   E. first torquer means for torquing said inner member with respect to said intermediate member about said one axis in response to a first control signal,
   F. second torquer means for torquing intermediate member with respect to said outer member about said one axis in response to a second control signal,
   G. flexure angle sensor means for generating an angle signal representative of the angular displacement of said inner member with respect to said intermediate member about said one axis,
   H. platform sensor means for generating an angular position signal representative of the angular position of said inner member about said reference axis, and
   I. control network including means for generating said first control signal, said first control signal being proportional to the sum of said angle signal and said angular position signal, and further including means for generating said second control signal, said second control signal being proportional to said angle signal.

2. A system according to claim 1 wherein said intermediate member is characterized by a relatively large moment of inertia about said axis.

3. A system according to claim 1 wherein said platform sensor means includes an integrating gyro.

4. A system according to claim 1 wherein said platform sensor means includes a rate gyro and an associated integrating network.

* * * * *